US012776598B2

(12) United States Patent
Welborn

(10) Patent No.: US 12,776,598 B2
(45) Date of Patent: Oct. 27, 2026

(54) REPLACEMENT CONDUCTOR CONNECTOR ASSEMBLIES AND METHODS FOR REPLACING CONDUCTOR CONNECTOR ASSEMBLIES

(71) Applicant: AFL Telecommunications LLC, Duncan, SC (US)

(72) Inventor: Matthew G. Welborn, Greenville, SC (US)

(73) Assignee: AFL Telecommunications LLC, Duncan, SC (US)

( * ) Notice: Subject to any disclaimer, the term of this patent is extended or adjusted under 35 U.S.C. 154(b) by 498 days.

(21) Appl. No.: 18/098,533

(22) Filed: Jan. 18, 2023

(65) Prior Publication Data

US 2024/0243494 A1 Jul. 18, 2024

(51) Int. Cl.
*H01R 11/12* (2006.01)
*H02G 1/14* (2006.01)

(52) U.S. Cl.
CPC ............... *H01R 11/12* (2013.01); *H02G 1/14* (2013.01)

(58) Field of Classification Search
CPC . H01R 11/12; H01R 4/20; H02G 1/14; H02G 7/056
USPC .......................................................... 439/883
See application file for complete search history.

(56) References Cited

U.S. PATENT DOCUMENTS

| | | | | |
|---|---|---|---|---|
| 3,656,084 A * | 4/1972 | Malia | H02G 15/103 439/88 |
| 7,128,619 B1 * | 10/2006 | Muench, Jr. | H01R 11/18 439/810 |
| 7,563,983 B2 * | 7/2009 | Bryant | H02G 7/056 174/88 R |
| 9,748,670 B1 | 8/2017 | Quesnel | |
| 2014/0273599 A1 * | 9/2014 | O'Sullivan | H01R 43/20 439/370 |

* cited by examiner

*Primary Examiner* — Christopher M Koehler
*Assistant Examiner* — Gregory L Mangot
(74) *Attorney, Agent, or Firm* — Dority & Manning, P.A.

(57) ABSTRACT

Replacement conductor connector accessories and methods are provided. A replacement conductor connector accessory includes an outer body defining an outer body interior, the outer body interior extending along a longitudinal axis, wherein a length of the outer body interior is defined along the longitudinal axis. The replacement conductor connector accessory further includes a filler tube disposed within the outer body interior and extending along a portion of the length, the filler tube defining a filler tube interior, wherein a length of the filler tube interior is defined along the longitudinal axis. The replacement conductor connector accessory further includes a filler rod disposed with the filler tube interior. The replacement conductor connector accessory further includes a core grip disposed within the outer body interior.

17 Claims, 6 Drawing Sheets

REPLACEMENT CONDUCTOR CONNECTOR ASSEMBLIES AND METHODS FOR REPLACING CONDUCTOR CONNECTOR ASSEMBLIES

FIELD

The present disclosure relates generally to conductor connector assemblies such as dead ends or splices, and more particularly to replacement conductor connector assemblies and methods for connecting conductors and replacement conductor connector assemblies.

BACKGROUND

Conductors are utilized in a variety of environments for carrying electrical current and generally facilitating the transmission of electricity. Conductor connector accessories are utilized to connect the conductors to other conductors or to other components of the energy transmission assembly such as other conductor connector accessories or the tower. Examples of conductor connector accessories include dead ends, splices, terminals, repair sleeves, t-taps, t-connectors, jumper connectors, etc.

In many cases, the conductors are installed in relatively high tension. Due to the relatively high-tension environments, it is desirable for the connection between a conductor connector accessory and conductor to be robust, thereby preventing relative movement between the conductor and conductor connector accessory and/or disconnection of the conductor from the conductor connector accessory.

Additionally, in many cases, the conductor connector accessories are utilized in high temperature applications, such as above 100 degrees Celsius, such as in some cases up to or greater than 250 degrees Celsius. As a result, the accessories themselves are subjected to high temperatures.

Installed conductor connector accessories often, and for a variety of reasons, need to be replaced. For example, conductor connector accessories may fail, may reach end of life, or may be improperly installed. Such replacement may be required after a period of energized service, and may in some cases be required shortly after beginning service or directly after initial installation. When a replacement is required, the failing or improperly installed accessory must be cut out of the span. Accordingly, it is desirable to have a replacement conductor connector accessory that not only restores the conductor span to full strength yet also keeps the span at the same sag and tension. Additionally, it is desirable for the replacement conductor connector accessory to be utilized in high temperature applications. Still further, it is desirable that such replacement conductor connector accessories are easily and efficiently installable.

Known replacement conductor connector accessories typically require new sag and tension calculations rather than keeping the span at the same sag and tension. Additionally, known replacement conductor connector accessories cannot be applied in high temperature applications. Still further, known replacement conductor connector accessories require filler compound and/or require multiple different in-field compression steps, thus complicating the installation process.

Accordingly, improved replacement conductor connector accessories and methods for replacing conductor connector accessories are desired in the art. In particular, improved replacement conductor connector accessories and methods which address the above deficiencies and desires would be advantageous.

BRIEF DESCRIPTION

Aspects and advantages of the invention in accordance with the present disclosure will be set forth in part in the following description, or may be obvious from the description, or may be learned through practice of the technology.

In accordance with one embodiment, a replacement conductor connector accessory is provided. The replacement conductor connector accessory includes an outer body defining an outer body interior, the outer body interior extending along a longitudinal axis, wherein a length of the outer body interior is defined along the longitudinal axis. The replacement conductor connector accessory further includes a filler tube disposed within the outer body interior and extending along a portion of the length, the filler tube defining a filler tube interior, wherein a length of the filler tube interior is defined along the longitudinal axis. The replacement conductor connector accessory further includes a filler rod disposed with the filler tube interior. The replacement conductor connector accessory further includes a core grip disposed within the outer body interior.

In accordance with another embodiment, a method for connecting a conductor and a replacement conductor connector accessory is provided. The method includes inserting an end portion of the conductor into a core grip of the replacement conductor connector accessory. The method further includes compressing an outer body, core grip, and end portion together.

These and other features, aspects and advantages of the present invention will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present invention, including the best mode of making and using the present systems and methods, directed to one of ordinary skill in the art, is set forth in the specification, which makes reference to the appended figures, in which.

DETAILED DESCRIPTION

Figure 1:
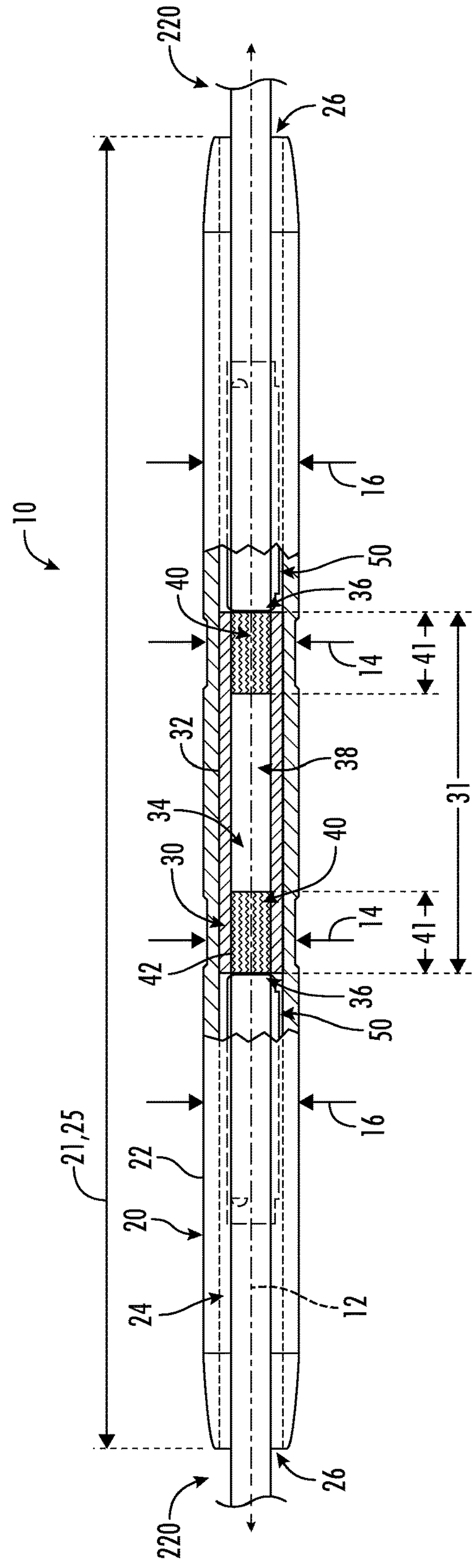
FIG. 1 is a side cross-sectional view of a replacement conductor connector accessory being connected to a conductor in accordance with embodiments of the present disclosure.

Reference now will be made in detail to embodiments of the present invention, one or more examples of which are illustrated in the drawings. The word "exemplary" is used herein to mean "serving as an example, instance, or illustration." Any implementation described herein as "exemplary" is not necessarily to be construed as preferred or advantageous over other implementations. Moreover, each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components. The singular forms "a," "an," and "the" include plural references unless the context clearly dictates otherwise. The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive- or and not to an exclusive- or. For example, a condition A or B is satisfied by any one of the following: A is true (or present) and B is false (or not present), A is false (or not present) and B is true (or present), and both A and B are true (or present).

Terms of approximation, such as "about," "generally," "approximately," or "substantially," include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Benefits, other advantages, and solutions to problems are described below with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The present disclosure relates generally to replacement conductor connector accessories and methods for connecting conductors and replacement conductor connector accessories together. Replacement conductor connector accessories and methods in accordance with the present disclosure advantageously facilitate improved connections between the conductors and replacement conductor connector accessories. For example, replacement conductor connector accessories allow for restoration of the conductor span to full strength while also keeping the span at the same sag and tension. Further, replacement conductor connector accessories can be utilized in high temperature applications, such as above 100 degrees Celsius, such as up to or above 250 degrees Celsius. Still further, replacement conductor connector accessories are easily and efficiently installable. For example, no filler compound is required when installing replacement conductor connector accessories. Further, only a single in-field step of compression using a single die is required.

In exemplary embodiments, replacement conductor connector accessories in accordance with the present disclosure are utilized with aluminum conductor steel supported ("ACSS") conductors or aluminum conductor steel reinforced ("ACSR") conductors. Alternatively, however, any suitable conductors may be utilized. Examples of suitable replacement conductor connector accessories include, for example, dead ends, splices, terminals, repair sleeves, t-taps, t-connectors, jumper connectors, and other suitable replacement connector accessories for connecting conductors to other conductors or to other components of an energy transmission assembly such as other conductor connector accessories or a tower.

Figure 2:
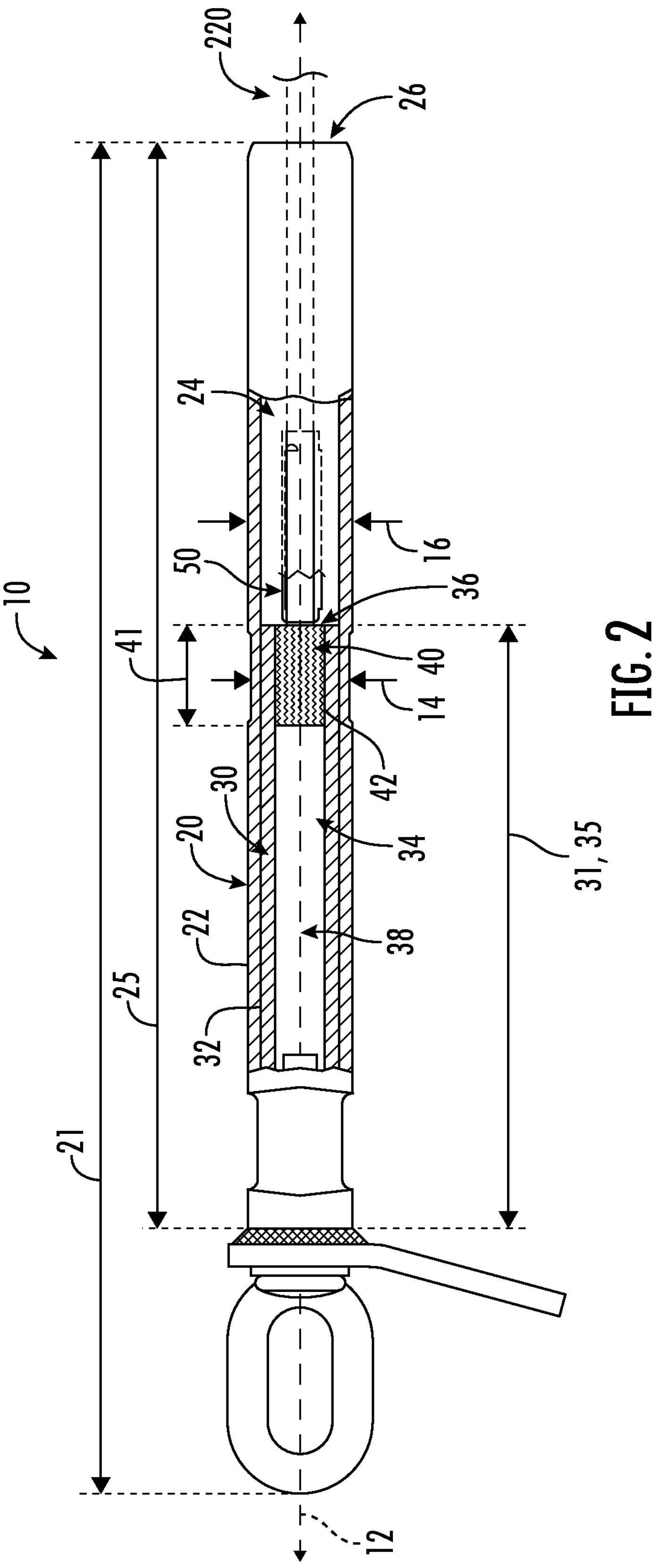
FIG. 2 is a partial side cross-sectional view of a replacement conductor connector accessory being connected to a conductor in accordance with embodiments of the present disclosure.

Referring now to FIGS. 1 and 2, embodiments of replacement conductor connector accessories 10 in accordance with the present disclosure are provided. FIG. 1 illustrates embodiments wherein the replacement conductor connector accessory 10 is a splice. Notably, in embodiments wherein the replacement conductor connector accessory 10 is a splice, the replacement conductor connector accessory 10 may be connected to a plurality of conductors. The same components, design, and method may be utilized with respect to each of the plurality of conductors. FIG. 2 illustrates embodiments wherein the replacement conductor connector accessory 10 is a dead end. Notably, in embodiments wherein the replacement conductor connector accessory 10 is a dead end (or another such accessory), the replacement conductor connector accessory 10 may be connected to only a single connector. In some embodiments, additional conductor connector accessories may be coupled to the replacement conductor connector accessory 10. For example, a terminal may be connected to a dead end via a bolted connection to a tongue of the dead end. The dead end and terminal may both be connected to conductors.

Figure 3:
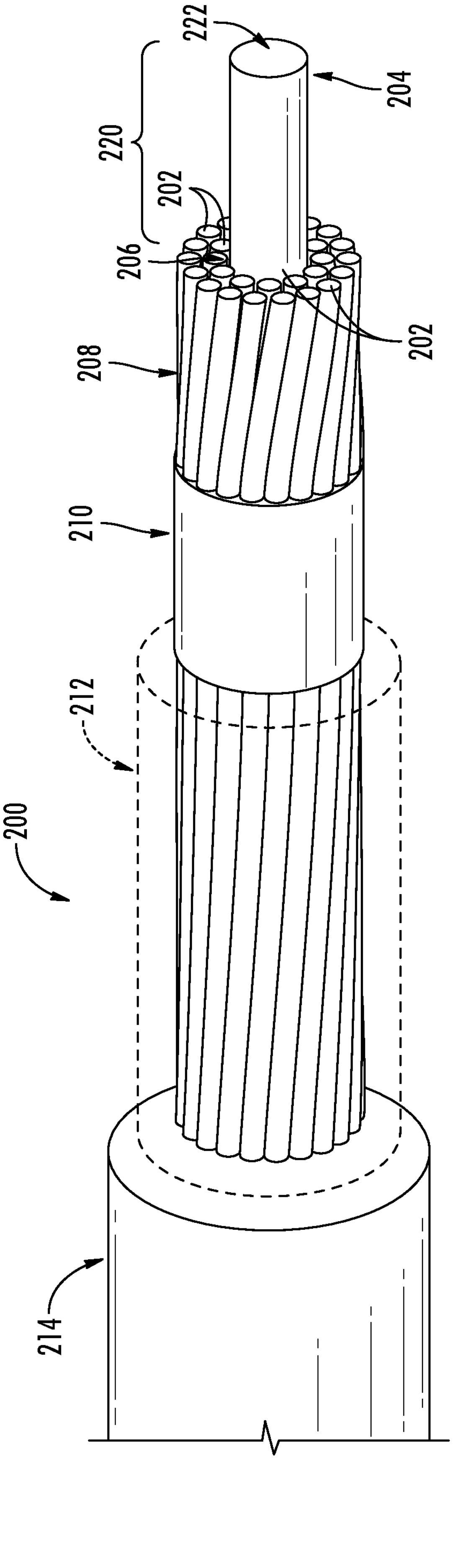
FIG. 3 is a perspective view of a conductor in accordance with embodiments of the present disclosure.

Referring briefly to FIG. 3, one embodiment of a conductor 200 with which a replacement conductor connector accessory 10 may be utilized is provided. In exemplary embodiments, conductors 200 with which replacement conductor connector accessory 10 are utilized may be "jacketed" (or "covered") conductors. In alternative embodiments, conductors 200 with which replacement conductor connector accessory 10 are utilized may be non-jacketed or uncovered conductors. In exemplary embodiments, replacement conductor connector accessories 10 in accordance with the present disclosure may be utilized with aluminum conductor composite reinforced ("ACCR") conductors, aluminum conductor composite core ("ACCC"), aluminum conductor steel supported ("ACSS") conductors, aluminum conductor composite supported ("ACCS") conductors, aluminum conductor steel reinforced ("ACSR") conductors, alumoweld ("AW") conductors, all aluminum conductors ("AAC"), steel ground wire, or other suitable conductors. Conductors having single member cores, or multiple member cores (such as stranded cores) may be utilized. The core materials and outer layer materials may be the same or may be different.

As shown, in some embodiments, conductor 200 may include a plurality of conductor strands 202 which may be arranged as a central core 204 (which may include one, as shown, or more conductor strands 202) surrounded by one or more generally concentric layers of conductor strands, such as a first layer 206 and a second layer 208, each of which may include a plurality of conductor strands 202. The one or more layers 206, 208, may in some embodiments have a helical arrangement, with each strand 202 extending helically about a longitudinal axis of the conductor 200.

In exemplary embodiments, the conductor strands 202 of conductor 200 are formed from one or more metals. For example, in some embodiments, each conductor strand 202 is formed from steel and/or aluminum. The conductor strand(s) 202 of the core 204 may be formed from the same material as the strand(s) 206, 208 of the outer layer(s), or may be formed from a different material from the strand(s) 206, 208 of the outer layer(s). For example, the strand(s) 202 of the core 204 and/or the strand(s) of the outer layer(s) 206, 208 may be formed from steel, aluminum, aluminum fiber, aluminum reinforced with alumina fibers, carbon or glass fibers in a polymer matrix (such as an epoxy or a thermoplastic), or other suitable material(s).

In some embodiments, conductor 200 may further include one or more layers surrounding the conductor layers 206, 208. Such layers may, for example, be formed of non-conductive materials such as polymers. For example, in some embodiments, a polymer shield layer 210 may be provided on the outermost layer 208 of the conductor layers. Further, one or more jackets (such as two, three, four, or more jackets), such as an inner jacket 212 and an outer jacket 214, may be provided. Jackets 212, 214 may be formed from or include suitable polymers. For example, jackets 212, 214 may be formed from or include polyethylene, such as high density and/or crosslinked polyethylene, or another suitable thermoplastic.

In exemplary embodiments as discussed herein, an end portion 220 of a conductor 200 is removed from the interior of an existing conductor connector assembly 10' and inserted into the interior of a replacement conductor connector assembly 10 to connect the conductor 200 to the replacement conductor connector assembly 10. In exemplary embodiments, the end portion 220 (which includes an end 222 of the conductor 200) includes only a portion of the core 204 of the conductor 200, with outer layers 206, 208, 210, 212, and/or 214 of the conductor 200 having been cut back and not included in the end portion 220.

Referring again to FIGS. 1 and 2, a replacement conductor connector accessory 10 in accordance with the present disclosure may include an outer body 20. The outer body 20 may include an outer surface 22 and an inner surface that defines an interior 24 of the outer body 20. The outer body 20 may be, relative to other components utilized to connect to a conductor 200 as discussed herein, the radially outer-most component of the accessory 10, and the outer surface 22 may be a radially outer-most surface of the accessory 10. In embodiments wherein accessory 10 includes a tongue or clevis, the tongue or clevis may be a component of or connected to the outer body 20, as shown in FIG. 2. In exemplary embodiments, the outer body 20 may be formed from aluminum, although in alternative embodiments other suitable materials such as other suitable metals may be utilized. Further, in exemplary embodiments, an outer body 20 (including components thereof such as a tongue or clevis) in accordance with the present disclosure may be an integrally formed part, with the components thereof formed as a single, unitary structure. Outer body 20 may be sized to accommodate within the interior 24 a filler tube 30 and core grip 50, as discussed herein. During assembly, the filler tube 30 may be inserted into the interior 24 such that the outer body 20 surrounds the filler tube 30. In exemplary embodiments as discussed herein, such assembly may occur in the factory, and not in the field.

Outer body 20 and interior 24 thereof may extend along a longitudinal axis 12. Further, a length 21 of the outer body 20 and a length 25 of the interior 24 may each be defined along the longitudinal axis 12. In some embodiments, as illustrated in FIG. 1, interior 24 may extend through the entire length 21 of the outer body 20, such that two opposing openings 26 are defined in opposing ends of the outer body 20. Alternatively, as illustrated in FIG. 2, interior 24 may extend through only a portion of the length 21 of the outer body 20, such that only a single opening 26 is defined in one end of the outer body 20 and the other end of the interior 24 is defined at an interior wall of the outer body 20.

A replacement conductor connector accessory 10 in accordance with the present disclosure may further include a filler tube 30. Filler tube 30 may be disposed within the outer body interior 24. The filler tube 30 may include an outer surface 32 and an inner surface that defines an interior 34 of the filler tube 30. When disposed within the outer body interior 24, outer surface 32 may contact the inner surface of the outer body 20. In exemplary embodiments, the filler tube 30 may be formed from aluminum, although in alternative embodiments other suitable materials such as other suitable metals may be utilized. Filler tube 30 may be sized to accommodate within the interior 34 one or more filler rods 40, as discussed herein. During assembly, the filler rod(s) 40 may be inserted into the interior 34 such that the filler tube 30 surrounds the filler rod(s) 40. In exemplary embodiments as discussed herein, such assembly may occur in the factory, and not in the field.

Filler tube 30 and interior 34 thereof may extend along the longitudinal axis 12. Further, a length 31 of the filler tube 30 and a length 35 of the interior 34 may each be defined along the longitudinal axis 12. In exemplary embodiments, interior 34 may extend through the entire length 31 of the filler tube 30, such that two opposing openings 36 are defined in opposing ends of the filler tube 30.

In exemplary embodiments, length 31 is less than length 25 of interior 24, such that the filler tube 30 extends through only a portion of the interior 24 of the outer body 20.

In some embodiments, as illustrated in FIG. 1, filler tube 30 may be positioned centrally within interior 24 of the outer body 20, such that respective ends of the filler tube 30 are approximately equidistant from the opposing ends of the outer body 20 (and openings 26 thereof). In other embodiments, as illustrated in FIG. 2, filler tube 30 may be positioned at one end of the interior 24 of the outer body 20, such as in contact with the interior wall of the outer body 20, and spaced from the end of the outer body 20 (and opening 26 thereof).

A replacement conductor connector accessory 10 in accordance with the present disclosure may further include one or more filler rods 40. Filler rods 40 may be solid, non-hollow components. Filler rods 40 may be disposed within the filler tube interior 34. The filler rods 40 may each include an outer surface 42. When disposed within the filler tube interior 34, outer surface 42 may contact the inner surface of the filler tube 30. In exemplary embodiments, the filler rods 40 may be formed from aluminum or steel, although in alternative embodiments other suitable materials such as other suitable metals may be utilized. As discussed, during assembly, the filler rod(s) 40 may be inserted into the interior 34 such that the filler tube 30 surrounds the filler rod(s) 40. In exemplary embodiments as discussed herein, such assembly may occur in the factory, and not in the field.

Filler rods 40 may each extend along the longitudinal axis 12. Further, a length 41 of each filler rod 40 may be defined along the longitudinal axis 12. In exemplary embodiments, each length 41 is less than length 35 of interior 34, such that each filler rod 40 extends through only a portion of the interior 34 of the filler tube 30. Further, in exemplary embodiments when more than one filler rod 40 is utilized, the total of the lengths 41 of all filler rods 40 being utilized is less than length 35 of interior 34, such that all of the filler rods 40 together extend through only a portion of the interior 34 of the filler tube 30. Accordingly, an open space 38 may be defined in the filler tube 30, such as between respective filler rods 40 as illustrated in FIG. 1 or between a filler rod 40 and the interior wall of the outer body 20.

In exemplary embodiments, the filler rod(s) 40, filler tube 30, and outer body 20 are compressed together. In particular, in exemplary embodiments, the filler rod(s) 40, filler tube 30, and outer body 20 are factory-compressed together after assembly in the factory. Factory compression locations are indicated in FIGS. 1 and 2 by reference numeral 14, and may be performed by any suitable factory compression process using a suitable compression die. Thus, in-field compression of these components is advantageously not required. Additionally, such factory-compression, along with the use of a core grip(s) as discussed herein, allows for filler compound to not be utilized in the accessory 10.

In exemplary embodiments, the construction of the filler rod(s) 40, filler tube 30, and outer body 20 as discussed herein is particularly advantageous. For example, the use of the particular materials, such as in exemplary embodiment aluminum for various such components, as well as the lack of filling compound, allows for use of the accessory at high temperatures. Further, the factory compression and assembly minimizes the number of in-field steps required for connecting a conductor 200 to an accessory 10, in particular requiring only a single in-field compression with a single die for each conductor 200 connected to the accessory. Still further, the use of a filler tube 30 along with filler rods 40 that have shorter lengths, and the resulting open space in the filler tube 30, advantageously reduces the weight of the accessory 10 while still allowing the accessory to perform as required, for example keeping a desired span with a desired sag and tension.

A replacement conductor connector accessory 10 in accordance with the present disclosure may further include one or more core grips 50. Each core grip 50 may be disposed within the outer body interior 24. Further, in exemplary embodiments, each core grip 50 may contact an end of the filler tube 30 and a filler rod 40 disposed therein. Core grip(s) 50 may be adjacent to, and not disposed in, the filler tube 30.

Each core grip 50 is designed to accommodate a conductor 200, such as an end portion 220 thereof, therein to connect the conductor 200 to the replacement conductor connector accessory 10. In some embodiments, the core grip 50 may include only a tube 60 and/or barrel 70. In other embodiments, additional components such as lobes 78 may also be included in a core grip 50.

Figure 4:
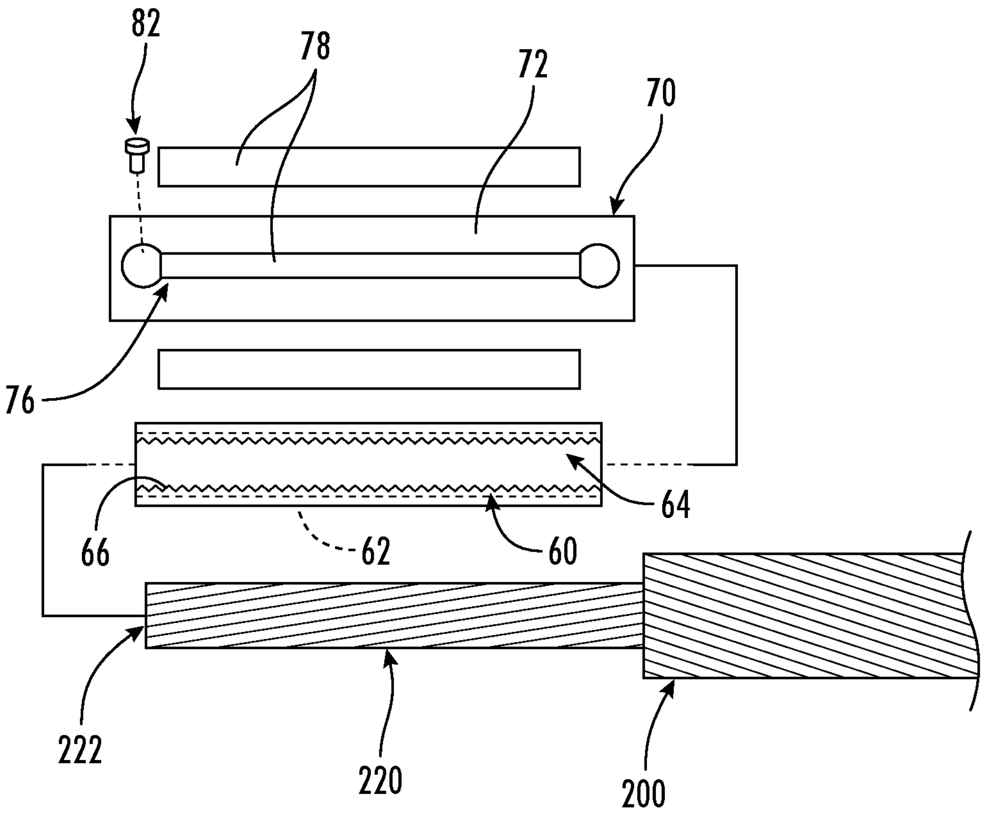
FIG. 4 is an exploded view of a core grip in accordance with embodiments of the present disclosure.
Figure 5:
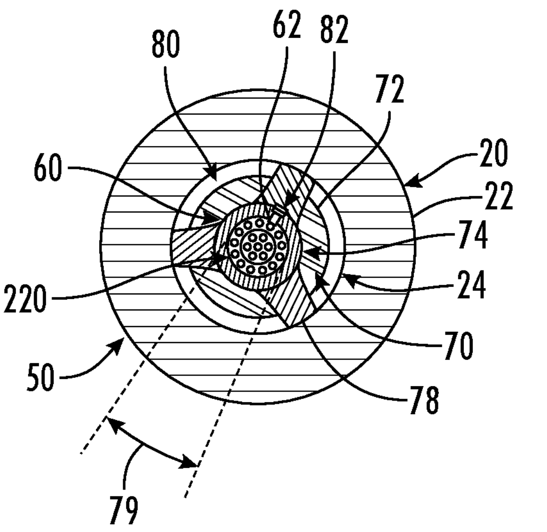
FIG. 5 is a front cross-sectional view of a replacement conductor connector accessory assembly in an uncompressed state in accordance with one embodiment of the present disclosure.
Figure 6:
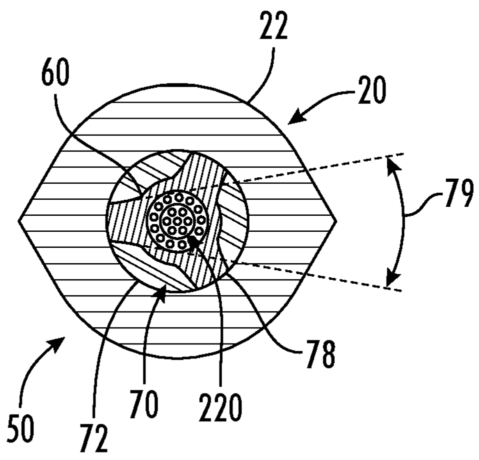
FIG. 6 is a front cross-sectional view of a replacement conductor connector accessory assembly in a compressed state in accordance with one embodiment of the present disclosure.

One exemplary embodiment of a core grip 50 is illustrated in FIGS. 4 through 6. As shown, core grip 50 may include one or more tubes 60. Each tube 60 may include an inner surface 62 that defines an interior 64 of the tube 60. In exemplary embodiments, each tube 60 may be formed from aluminum, although in alternative embodiments other suitable materials such as other suitable metals may be utilized. A tube 60 may be sized to accommodate within the interior 64 an end portion 220 (which includes an end 222) of a conductor 200, as discussed herein. During assembly, the end portion 220 may be inserted into the interior 64 such that the tube 60 surrounds the end portion 220.

In exemplary embodiments, a grit coating 66 may be provided. The grit coating 66 may be disposed on the inner surface 62 of a tube 60, and may facilitate improved gripping of the tube 60 and replacement conductor connector accessory 10 generally on the conductor. The grit coating 66 may include a plurality of particles, such as in exemplary embodiments silicon carbide particles. The grit coating 66 may further include a varnish or other suitable adhesive in which the particles may be embedded, and which may provide a connection between the particles and the inner surface 62. When the end portion 220 of a conductor 200 is disposed within the interior 64 of a tube 60, the end portion 220 may thus contact the grit coating 66.

An accessory 10 may further include one or more barrels 70. A barrel 70 may include an outer surface 72 and an inner surface which defines an interior 74. Further, barrel 70 may include a plurality of radially extending passages 76 extending between the outer surface 72 and the interior 74. The passages 76 may, for example, be disposed in one or more generally annular arrays about the interior 74. In exemplary embodiments, three passages 76 may be defined in a single annular array. Alternatively, two, four or more passages 76 may be defined in a single annular array. Further, in some embodiments, multiple annular arrays, such as two annular arrays as shown, of passage 76 may be defined. In exemplary embodiments, each barrel 70 may be formed from a second material different than the first material such as a steel, although in alternative embodiments other suitable materials such as other suitable metals may be utilized. A barrel 70 may be sized to accommodate within the interior 74 a tube 60 (in which an end portion 220 of a conductor 200 is disposed). During assembly, tubes 60 and associated end portions 220 may be inserted, such as fully inserted, into the interior 74 such that the barrel 70 surrounds the tube(s) 60.

A plurality of lobes 78 may additionally be provided. Each lobe 78 may be disposed within one of the plurality of passages 76, and may thus extend into the interior 74. When assembled, i.e. when an associated tube 60 is disposed within the interior 74 of a barrel 70, the lobes 78 may contact the tube 60 (i.e. an outer surface thereof). In exemplary embodiments, each lobe 78 may be formed from aluminum, although in alternative embodiments other suitable materials such as other suitable metals may be utilized.

In exemplary embodiments, each lobe 78 may have a wedge-shaped cross-sectional profile (i.e. when viewed in a front cross-sectional view as illustrated in FIGS. 5 and 6). In exemplary embodiments, a wedge angle 79 of between 5 degrees and 40 degrees, such as between 10 degrees and 30 degrees, such as between 15 degrees and 25 degrees, such as 20 degrees, may be defined for each lobe 78. Such wedge angles 79 are advantageous as they facilitate capture of the lobes 78 within the passages 76. In exemplary embodiments wherein the lobes 78 are formed from a material, such as aluminum, that is different from the material of the barrel 70, these materials may have different expansion rates. For example, the first material (such as aluminum) may expand faster than the second material (such as steel) at high temperatures as discussed herein. Because the lobes 78 are captured by virtue of the wedge angles 79, such expansion occurs generally radially inward, thus increasing the grip on the tube 60 and conductor 200 therein.

Further, in exemplary embodiments when in an uncompressed state as illustrated in FIG. 5, a total cross-sectional surface area (i.e. when viewed in a front cross-sectional view as illustrated in FIGS. 5 and 6) of the lobes 78 may be greater than or equal to a total cross-sectional gap area 80 (at the same cross-section) between barrel 70 and the outer body 20.

In some embodiments, one or more fasteners 82, such as rivets, self-tapping screws, pins, or other suitable mechanical fasteners, may be provided in core grip 50. Each fastener 82 may be inserted through one of the plurality of the passages 76 and into contact with a tube 60 inserted therein. In some embodiments, fastener 82 may merely contact an outer surface of the tube 60, while in other embodiments fastener 82 may extend into and/or through the tube 60 into the interior thereof. Fastener 82 may, by being partially positioned within a passage 76 and in contact with the tube 60, limit or prevent rotation of the tube 60 within the barrel 70 and prevent removal of the tube 60 from the barrel 70.

Core grip(s) 50 may, in exemplary embodiments, be factory inserted into the outer body 20. Accordingly, a replacement conductor connector accessory 10 may be provided to the field as a single assembly.

To connect a conductor 200 to a replacement conductor connector accessory 10, an end portion 220 of the conductor 200 is inserted into the core grip 50. The core grip 50 may in exemplary embodiments be already disposed within the outer body 20, or alternatively may be inserted into outer body 20 after end portion 220 is inserted therein. In exemplary embodiments, the end portion 220 is inserted into the core grip 50 such that, upon insertion thereof or upon insertion of the core grip 50 into the outer body 20, the end portion 220 contacts a filler rod 40.

Further, after insertion of the end portion 220 into the core grip 50, the outer body 20, core grip 50, and end portion 220 may be compressed together. In particular, in exemplary embodiments, the outer body 20, core grip 50, and end portion 220 are field-compressed together, such as after insertion of the end portion 220 into the core grip 50. In-field compression locations are indicated in FIGS. 1 and 2 by reference numeral 16, and may be performed by any suitable in-field compression process using a suitable compression die. Notably, in exemplary embodiments, only this single compression 16 is required in-field for connection of each conductor 200 to the replacement conductor connector accessory 10.

Figure 7:
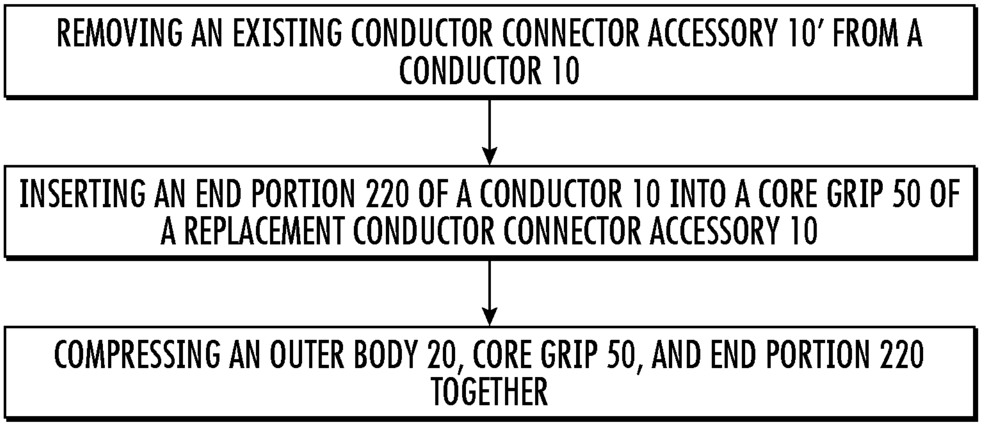
FIG. 7 is a flow chart illustrating a method in accordance with embodiments of the present disclosure.

Referring now to FIG. 7, the present disclosure is further directed to methods for connecting one or more conductors 200 to a replacement conductor connector accessory 10. Such method may include, for example, the step of removing an existing conductor connector accessory 10' from one or more conductors 200. The existing conductor connector accessory 10' may be an originally installed or previous replacement conductor connector accessory 10', and may have any suitable configuration or components. One such existing conductor connector accessory 10' is disclosed in U.S. Pat. No. 9,748,670, the disclosure of which is incorporated by reference herein in its entirety.

A method in accordance with the present disclosure may additionally or alternatively include inserting an end portion 220 of the conductor 200 into a core grip 50 of a replacement conductor connector accessory 10, as discussed herein. The method may further include compressing a outer body 20, core grip 50, and end portion 220 together.

Methods in accordance with the present disclosure may advantageously result in improved replacement conductor connector accessories having one or more advantages as discussed herein.

Further aspects of the invention are provided by one or more of the following embodiments:

A replacement conductor connector accessory. The replacement conductor connector accessory includes an outer body defining an outer body interior, the outer body interior extending along a longitudinal axis, wherein a length of the outer body interior is defined along the longitudinal axis. The replacement conductor connector accessory further includes a filler tube disposed within the outer body interior and extending along a portion of the length, the filler tube defining a filler tube interior, wherein a length of the filler tube interior is defined along the longitudinal axis. The replacement conductor connector accessory further includes a filler rod disposed with the filler tube interior: and a core grip disposed within the outer body interior.

A method for connecting a conductor and a replacement conductor connector accessory. The method includes inserting an end portion of a conductor into a core grip of a replacement conductor connector accessory. The method further includes compressing an outer body, core grip, and end portion together.

A replacement conductor connector accessory or method in accordance with any one or more embodiments disclosed herein, wherein a length of the filler tube along the longitudinal axis is less than the length of the outer body interior.

A replacement conductor connector accessory or method in accordance with any one or more embodiments disclosed herein, wherein a length of the filler rod along the longitudinal axis is less than the length of the filler tube interior.

A replacement conductor connector accessory or method in accordance with any one or more embodiments disclosed herein, wherein the filler rod, filler tube, and outer body are compressed together.

A replacement conductor connector accessory or method in accordance with any one or more embodiments disclosed herein, wherein the filler rod, filler tube, and outer body are factory-compressed together.

A replacement conductor connector accessory or method in accordance with any one or more embodiments disclosed herein, wherein no compound is utilized in the replacement conductor connector accessory.

A replacement conductor connector accessory or method in accordance with any one or more embodiments disclosed herein, wherein the filler tube is formed from aluminum.

A replacement conductor connector accessory or method in accordance with any one or more embodiments disclosed herein, wherein the outer body is formed from aluminum.

A replacement conductor connector accessory or method in accordance with any one or more embodiments disclosed herein, wherein the core grip includes a tube comprising an interior surface defining an interior, a barrel defining an interior and surrounding the tube, the barrel defining a plurality of radial passages extending between an outer surface of the barrel and the interior of the barrel, and a plurality of lobes, each of the plurality of lobes disposed within one of the plurality of passages and in contact with tube.

A replacement conductor connector accessory or method in accordance with any one or more embodiments disclosed herein, wherein the outer body is a dead end.

A replacement conductor connector accessory or method in accordance with any one or more embodiments disclosed herein, wherein the outer body is a splice.

A replacement conductor connector accessory or method in accordance with any one or more embodiments disclosed herein, further comprising removing an existing conductor connector accessory.

A replacement conductor connector accessory or method in accordance with any one or more embodiments disclosed herein, wherein the end portion is inserted such that the end portion contacts the filler rod.

A replacement conductor connector accessory or method in accordance with any one or more embodiments disclosed herein, wherein only a single in-field compression is required to connect the conductor and the replacement conductor connector accessory.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A replacement conductor connector accessory, the replacement conductor connector accessory comprising:
- an outer body defining an outer body interior, the outer body interior extending along a longitudinal axis, wherein a length of the outer body interior is defined along the longitudinal axis;
- a filler tube disposed within the outer body interior and extending along a portion of the length, the filler tube defining a filler tube interior, wherein a length of the filler tube interior is defined along the longitudinal axis;
- a filler rod disposed within the filler tube interior, wherein a length of the filler rod along the longitudinal axis is less than the length of the filler tube interior such that an open space is defined in the filler tube; and
- a core grip disposed within the outer body interior, wherein the core grip contacts the filler tube and the filler rod adjacent thereto along a longitudinal axis.

2. The replacement conductor connector accessory of claim 1, wherein the filler rod, filler tube, and outer body are factory-compressed together at a compression location at the outer body longitudinally non-overlapping the core grip.

3. The replacement conductor connector accessory of claim 1, wherein no compound is utilized in the replacement conductor connector accessory.

4. The replacement conductor connector accessory of claim 1, wherein the filler tube is formed from aluminum.

5. The replacement conductor connector accessory of claim 1, wherein the outer body is formed from aluminum.

6. The replacement conductor connector accessory of claim 1, wherein the core grip comprises:
- a tube comprising an interior surface defining an interior,
- a barrel defining an interior and surrounding the tube, the barrel defining a plurality of radial passages extending between an outer surface of the barrel and the interior of the barrel; and
- a plurality of lobes, each of the plurality of lobes disposed within one of the plurality of passages and in contact with tube.

7. The replacement conductor connector accessory of claim 1, wherein the outer body is a dead end.

8. The replacement conductor connector accessory of claim 1, wherein the outer body is a splice.

9. The replacement conductor connector assembly of claim 1, wherein the core grip is not disposed within the filler tube interior when the core grip contacts the filler tube and the filler rod.

10. A method for connecting a conductor and a replacement conductor connector accessory, the method comprising:
- inserting, into an outer body defining an outer body interior extending along a longitudinal axis, an end portion of the conductor into a core grip disposed within the outer body interior, wherein the end portion is inserted such that the end portion contacts adjacent along the longitudinal axis a filler tube and a filler rod disposed within a filler tube interior extending along a portion of a length of the outer body along the longitudinal axis, wherein a length of the filler rod along the longitudinal axis is less than the length of the filler tube interior such that an open space is defined along the longitudinal axis in the filler tube; and
- after inserting the end portion of the conductor into the core grip, compressing the outer body, the core grip, and the end portion together.

11. The method of claim 10, further comprising removing an existing conductor connector accessory prior to inserting the end portion of the conductor into the core grip.

12. The method of claim 10, wherein compressing the outer body, the core grip, and the end portion together comprises a single in-field compression to connect the conductor and the replacement conductor connector accessory.

13. The method of claim 10, wherein the filler tube, the outer body, or both, are formed from aluminum.

14. The method of claim 10, wherein the outer body is one of a dead end or a splice.

15. The method of claim 10, wherein inserting the end portion of the core grip such that the end portion contacts adjacent along the longitudinal axis the filler tube and the filler rod disposed within the filler tube interior does not dispose the core grip in the filler tube.

16. The method of claim 10, the method comprising:
- compressing the filler rod, the filler tube, and the outer body together prior to inserting the end portion of the conductor into the core grip.

17. The method of claim 16, wherein compressing the outer body, the core grip, and the end portion together comprises a compression location at the outer body longitudinally non-overlapping the filler tube and the filler rod.

* * * * *